(12) United States Patent
de Ganon et al.

(10) Patent No.: US 10,956,902 B2
(45) Date of Patent: Mar. 23, 2021

(54) BROWSER EXTENSION FOR FIELD DETECTION AND AUTOMATIC POPULATION AND SUBMISSION

(71) Applicant: CAPITAL ONE SERVICES, LLC, McLean, VA (US)

(72) Inventors: Matthew de Ganon, Hartsdale, NY (US); Thomas S. Poole, Chantilly, VA (US); Paul Y. Moreton, Glen Allen, VA (US); Dwij Trivedi, Oakton, VA (US); Kunal Arora, Great Falls, VA (US); Katherine H. McHugh, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 260 days.

(21) Appl. No.: 15/678,443

(22) Filed: Aug. 16, 2017

(65) Prior Publication Data

US 2018/0046998 A1 Feb. 15, 2018

Related U.S. Application Data

(63) Continuation of application No. 15/676,696, filed on Aug. 14, 2017, now abandoned.
(Continued)

(51) Int. Cl.
*G06Q 20/38* (2012.01)
*H04L 29/08* (2006.01)
(Continued)

(52) U.S. Cl.
CPC ......... *G06Q 20/382* (2013.01); *G06Q 20/102* (2013.01); *G06Q 20/12* (2013.01);
(Continued)

(58) Field of Classification Search
None
See application file for complete search history.

(56) References Cited

U.S. PATENT DOCUMENTS 8,650,481 B1\* 2/2014 Boodman ........... G06F 11/0766
715/234
2005/0257148 A1\* 11/2005 Goodman ............ G06F 17/243
715/226
(Continued)

OTHER PUBLICATIONS

Green, Ido; "Help users checkout faster with Autofill" https://developers.google.com/web/updates/2015/06/checkout-faster-with-autofill accessed on Nov. 24, 2020 (Year: 2015).\*

*Primary Examiner* — David P Sharvin
(74) *Attorney, Agent, or Firm* — Finnegan, Henderson, Farabow, Garrett & Dunner, LLP

(57) ABSTRACT

A networked system includes: a communication device configured to communicate with a computing device executing a browser extension application and a web browser application; a memory storing instructions; and a processor configured to execute the instructions to perform operations comprising: displaying, through the web browser application, a web page on the computing device, the web page being associated with a merchant and including a field requiring population; receiving, through the browser extension application, a secure token mapped to data corresponding to the field, the browser extension application being configured to: (i) detect the field, (ii) automatically populate the field with the secure token sufficient for a financial service provider system to authenticate, (iii) detect a submission script associated with the web page, and (iv) automatically execute the submission script to submit the secure token to the networked system; and transmitting the secure token to the financial service provider system.

18 Claims, 11 Drawing Sheets

Related U.S. Application Data

(60) Provisional application No. 62/375,293, filed on Aug. 15, 2016.

(51) Int. Cl.
  *G06Q 20/12*  (2012.01)
  *H04L 29/06*  (2006.01)
  *G06Q 20/10*  (2012.01)
  *G06Q 20/40*  (2012.01)

(52) U.S. Cl.
  CPC ......... *G06Q 20/385* (2013.01); *G06Q 20/401* (2013.01); *H04L 63/0428* (2013.01); *H04L 67/02* (2013.01)

(56) References Cited

U.S. PATENT DOCUMENTS

2015/0052061 A1*  2/2015  Anderson ............ G06Q 20/027
                                                           705/71
2017/0256003 A1*  9/2017  Isaacson ................ G06Q 20/12

* cited by examiner

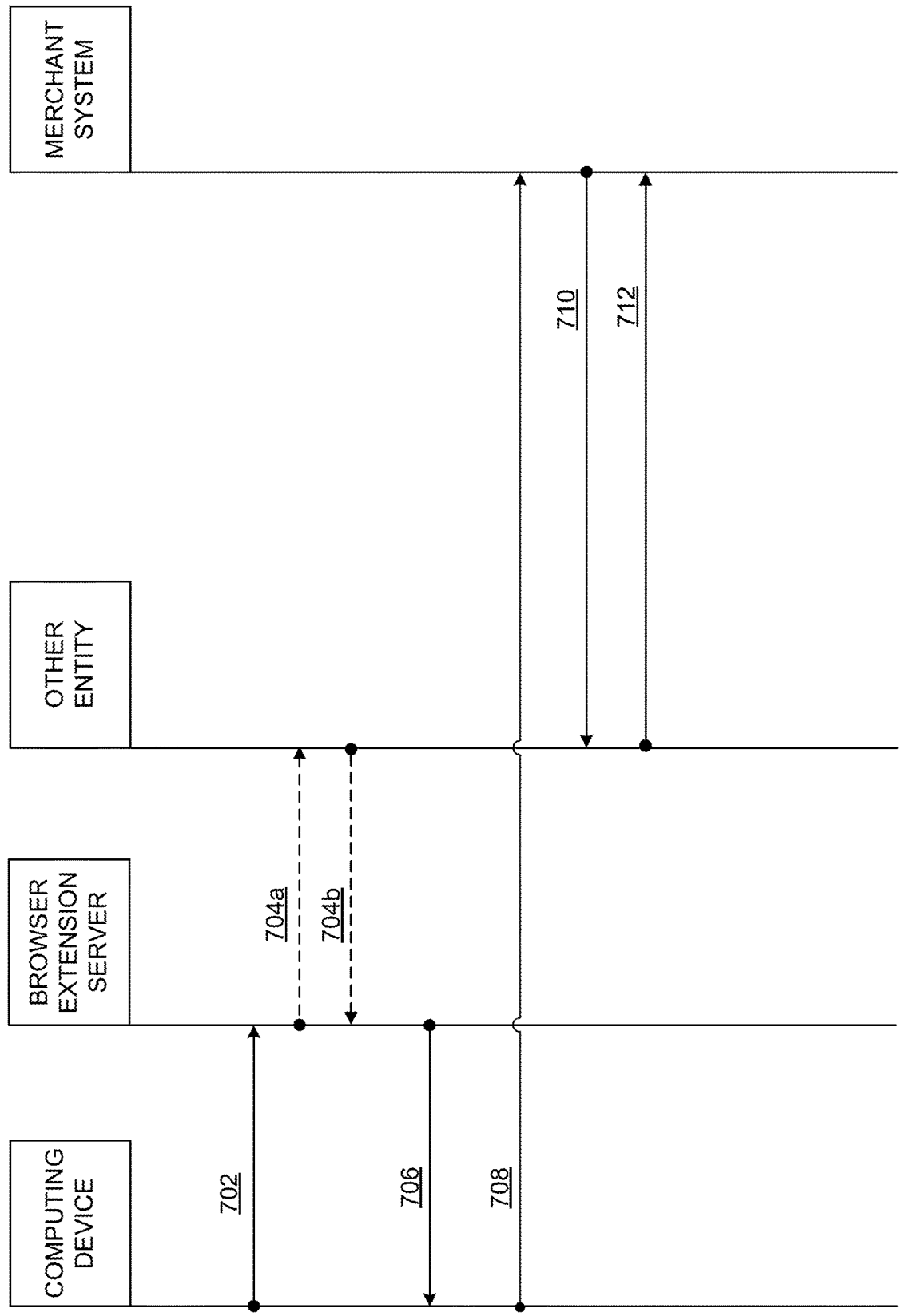

BROWSER EXTENSION FOR FIELD DETECTION AND AUTOMATIC POPULATION AND SUBMISSION

RELATED APPLICATIONS

This application claims priority from U.S. patent application Ser. No. 15/676,696, filed Aug. 14, 2017, which in turn claims priority from U.S. Provisional Patent Application No. 62/375,293, filed Aug. 15, 2016, the contents of all of which are incorporated by reference in the present application.

RELATED APPLICATIONS

The present disclosure generally relates to Internet technology, and more particularly, to browser extension systems and methods for field detection and automatic population and submission.

BACKGROUND

Many users access information on the Internet using software applications known as web browser applications. Web browser applications interpret the various languages in which Internet information is written, such as hyper-text markup language (HTML) or an extensible markup language (XML), to provide the information to users in a user-readable format.

Additional functionality may be added to web browsers by browser extension applications. A browser extension application is a software application made to be downloaded by a user and installed on the user's computing device to offer additional features to the browser. When the user accesses the Internet through a web browser application, the browser extension application may provide the user with additional functionality within the web browser application.

Currently, web pages accessed through web browser applications often include one or more fields into which a user can enter data. Through such fields, a user can exchange information with a recipient (e.g., a provider or operator of the web page) to carry out a transaction, such as, for example, implementing a financial transaction, signing up for membership related to the web page, or requesting that a service associated with the web page provide information to the user at a later date.

Accurate provision of such information is critical to ensuring not only the proper implementation of the transaction in process, but also the prevention of wasted computer processing and communications resources that occur when data is mis-entered into one or more fields. Such mis-entered data may additionally cause secondary problems, such as those resulting when the mis-entered data is associated with someone other than the user. For example, a mis-entered e-mail address provided to a medical service could result in patient-sensitive data being forwarded to someone other than the intended recipient.

Furthermore, even when such data is accurately entered into the appropriate fields, the authority of both the user and the recipient to use the data is often indeterminate. For example, the recipient is not provided with any secondary authentication that the user is authorized to use the data for the entered purpose or that the recipient of such data is entitled to use the data for something beyond the scope intended by the user who entered the data. It is desirable to provide improved technology to address these issues.

SUMMARY

The disclosed embodiments include browser extension systems and methods for field detection and automatic population and submission.

In one embodiment, a browser extension system is disclosed. The browser extension system includes a communication device configured to communicate with (i) a computing device executing a browser extension application and a web browser application, and (ii) a networked system. The browser extension system also includes a memory storing instructions. The browser extension system further includes a processor configured to execute the instructions to perform operations comprising: maintaining data associated with the computing device; detecting, through the browser extension application, a field in a web page associated with the networked system and provided by the computing device through the web browser application; and in response to detecting the field: (i) automatically populating the field, through the browser extension application, with a secure token mapped to the data, (ii) detecting, through the browser extension application, a submission script associated with the web page, and (iii) automatically executing the submission script to submit the secure token through the browser extension application to the networked system.

In another embodiment, a computer-implemented browser extension method for use in a computing device is disclosed. The method includes detecting a field in a web page displayed by the computing device, the web page being associated with a networked system. The method also includes in response to detecting the field, (i) automatically transmitting an indication of the field to a server, (ii) receiving, from the server, data for populating the field, (iii) automatically populating the field with a secure token mapped to the received data, and (iv) detecting a submission script associated with the web page and automatically executing the submission script to submit the secure token to the networked system.

In another embodiment, a networked system is disclosed. The networked system includes a communication device configured to communicate with a computing device executing a browser extension application and a web browser application. The networked system also includes a memory storing instructions. The networked system further includes a processor configured to execute the instructions to perform operations comprising: displaying, through the web browser application, a web page on the computing device, the web page being associated with a merchant and including a field requiring population; receiving, through the browser extension application, a secure token mapped to data corresponding to the field, the browser extension application being configured to: (i) detect the field, (ii) automatically populate the field with the secure token sufficient for a financial service provider system to authenticate, (iii) detect a submission script associated with the web page, and (iv) automatically execute the submission script to submit the secure token to the networked system; and transmitting the secure token to the financial service provider system.

In yet another embodiment, a networked system is disclosed. The networked system includes a communication device configured to communicate with a browser extension server and a merchant system, both the browser extension server and the merchant system being in communication with a computing device executing a browser extension application and a web browser application. The networked system also includes a memory storing instructions. The networked system further includes a processor configured to execute the instructions to perform operations comprising: maintaining a user account; receiving, from the merchant system, a secure token mapped to the user account; and authorizing a purchase transaction based on the secure token. The browser extension server is configured to: detect, through the browser extension application, a field in a web page associated with the merchant system and provided by the computing device through the web browser application; and in response to detecting the field: (i) automatically populate the field, through the browser extension application, with the secure token; (ii) detect, through the browser extension application, a submission script associated with the web page; and (iii) automatically execute the submission script, thereby submitting the secure token through the browser extension application to the merchant system. The merchant system is configured to: display the web page on the computing device through the web browser application; receive the secure token through the browser extension application; and transmit the secure token to the networked system.

Aspects of the disclosed embodiments may include non-transitory, tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 7 is a flowchart of a browser extension message stream, consistent with disclosed embodiments.

DETAILED DESCRIPTION

Reference will now be made in detail to the disclosed embodiments, examples of which are illustrated in the accompanying drawings.

The disclosed systems, methods, and media include a browser extension application configured to identify fields requiring population in web pages, populate the fields with secure tokens, and execute submission of the secure tokens through the web pages. Unlike conventional browser extension applications, which may suffer inefficiencies and unintended information exchange as a result of mis-entered data, the disclosed browser extension application may reduce mis-entry of data through automatic detection and population of fields within web pages. Moreover, while with conventional browser extension applications the authority of both a user and a recipient of provided information may be indeterminate, with the disclosed browser extension application subsequent use of data may be secured through both the use of secure tokens and automatic submission. By generating secure tokens mapped to data and populating fields with the secure tokens, rather than with unsecured data, the disclosed browser extension application may avoid unauthorized downstream use of the unsecured data, thereby resolving the indeterminacy of users' and recipients' authority faced by conventional browser extension applications. Moreover, by automatically submitting the populated secure token through execution of a detected submission script, the disclosed browser extension application may reduce the risk that the unsecured data may be intercepted and/or corruption after population but prior to submission (via, e.g., keystroke logging, screen scraping, etc.). In these manners, the disclosed browser extension application represents an improvement over conventional browser extension applications.

Figure 1:
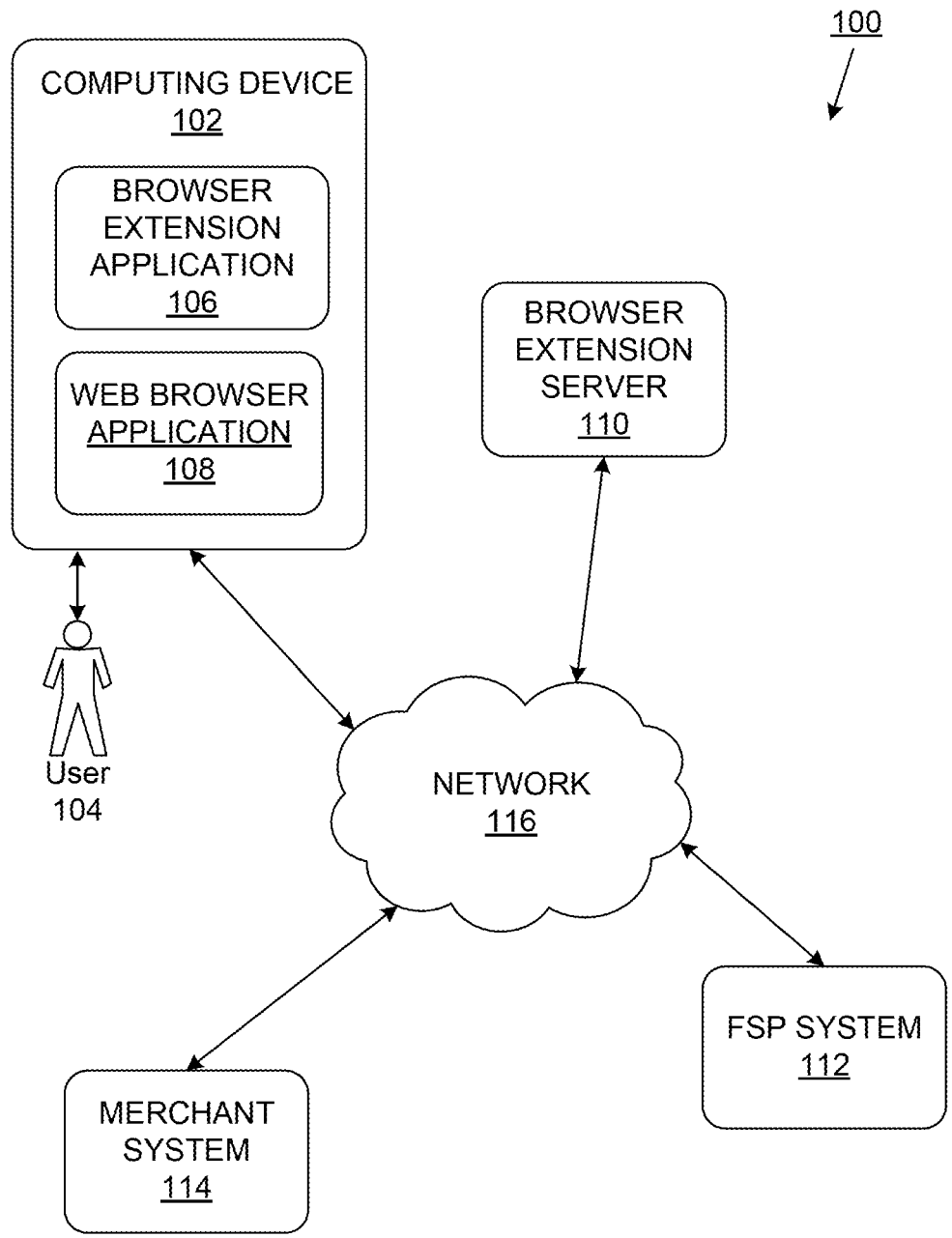
FIG. 1 is a block diagram of an exemplary system for performing a browser extension process, consistent with disclosed embodiments.

FIG. 1 is a block diagram of an exemplary system 100, consistent with disclosed embodiments. System 100 may be configured for performing a browser extension process consistent with disclosed embodiments.

As shown, system 100 may include computing device 102 associated with a user 104. Computing device 102 may be configured to execute, among other programs, a browser extension application 106 and a web browser application 108. System 100 may further include a browser extension server 110, a financial service provider (FSP) system 112, and a merchant system 114. As shown, computing device 102, browser extension server 110, FSP system 112, and merchant system 114 may be communicatively coupled by a network 116.

While only one computing device 102, browser extension server 110, FSP system 112, merchant system 114, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

Computing device 102 may be one or more computing devices configured to perform operations consistent with executing browser extension application 106 and with executing web browser application 108. Computing device 102 is further described below in connection with FIG. 3.

Browser extension application 106 may be one or more software applications configured to perform operations consistent with detecting fields in web pages, such as fields in web pages associated with merchant system 114. Browser extension application 106 may be further configured to perform operations consistent with automatically populating fields in web pages with data associated with computing device 102 and/or user 104. Browser extension application 106 may be still further configured to perform operations consistent with automatically submitting the data populated in the fields in the web page to merchant system 114. In some embodiments, browser extension application 106 may be isolated from web pages, such that web pages cannot access code and/or other information associated with the browser extension application 106. In some embodiments, for instance, the browser extension application 106 may include one more content scripts configured to interact with the web pages, thereby isolating the code and/or other information of the browser extension application 106. Browser extension application 106 is further described below in connection with FIGS. 2 and 3.

Web browser application 108 may be one or more software applications configured to perform operations consistent with providing web pages, such as web pages associated with merchant system 114. The web pages may include fields. Web browser application 108 is further described below in connection with FIG. 3.

Browser extension server 110 may be one or more computing devices configured to perform operations consistent with providing browser extension application 106. In some embodiments, browser extension server 110 may maintain data associated with computing device 102 and/or user 104. In some embodiments, browser extension server 110 may be further configured to perform operations consistent with generating secure tokens mapped to underlying data, such as financial service accounts. Browser extension server 110 is further described below in connection with FIG. 2.

The secure tokens may be a generated identifier that maps back to an identifier of underlying data. For example, in the case of a secure token mapped to a financial service account, the secure token may be a generated identifier that maps back to a primary account number (PAN) (e.g., a 16-digit PAN often printed on a financial service product) or other identifier. The secure token identifier may be, for example, a randomly generated identifier. The secure token identifier may be nonreversible, such that the underlying data cannot be discovered through decryption of the secure token. Only an authorized recipient, seeking to access the underlying data where it is stored, can gain access to the underlying data.

FSP system 112 may be associated with a financial service entity that provides, maintains, manages, or otherwise offers financial services. For example, the financial service entity may be a bank, credit card issuer, or any other type of financial service entity that generates, provides, manages, and/or maintains user accounts for one or more customers. In some embodiments, user accounts may include, for example, credit card accounts, loan accounts, checking accounts, savings accounts, reward or loyalty program accounts, and/or any other type of financial service account known to those skilled in the art.

FSP system 112 may be one or more computing devices configured to perform operations consistent with maintaining financial service accounts, including a financial service account associated with computing device 102 and/or user 104. FSP system 112 may be further configured to authenticate financial transactions associated with such financial service accounts. In particular, FSP system 112 may be configured to authenticate financial transactions associated with a financial service account associated with user 104. In some embodiments, FSP system 112 may be further configured to generate content for a display device included in, or connected to, computing device 102, such as through a mobile banking or other application on computing device 102. Alternatively or additionally, FSP system 112 may be configured to provide content through one or more web pages or online portals that are accessible by computing device 102 over network 116. The disclosed embodiments are not limited to any particular configuration of FSP system 112.

While browser extension server 110 and FSP system 112 are shown separately, in some embodiments browser extension server 110 may include or be otherwise related to FSP system 112. For example, in some embodiments the facility of browser extension server 110 may be provided instead by FSP system 112, or vice versa. Alternatively or additionally, in some embodiments, browser extension server 110 may be included in, and/or be otherwise related to, any other entity in system 100 and/or a third-party not shown in system 100. Alternatively or additionally, browser extension server 110 may be a standalone server. Browser extension server 110 may take other forms as well.

Merchant system 114 may be a networked system including one or more computing devices configured to perform operations consistent with providing web pages that are accessible by computing device 102 over network 116. For example, the web pages may be provided at computing device 102 through web browser application 108. In some embodiments, merchant system 114 may be associated with a merchant that provides goods or services. Further, in some embodiments, the web pages may be online retail web pages through which user 104 may engage in purchase transactions to purchase the merchant's goods or services. Other web pages are possible as well. The disclosed embodiments are not limited to any particular configuration of merchant system 114. In some embodiments, merchant system 114 may be one or more other third-party systems configured to provide web pages that are accessible by computing device 102 over network 116.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
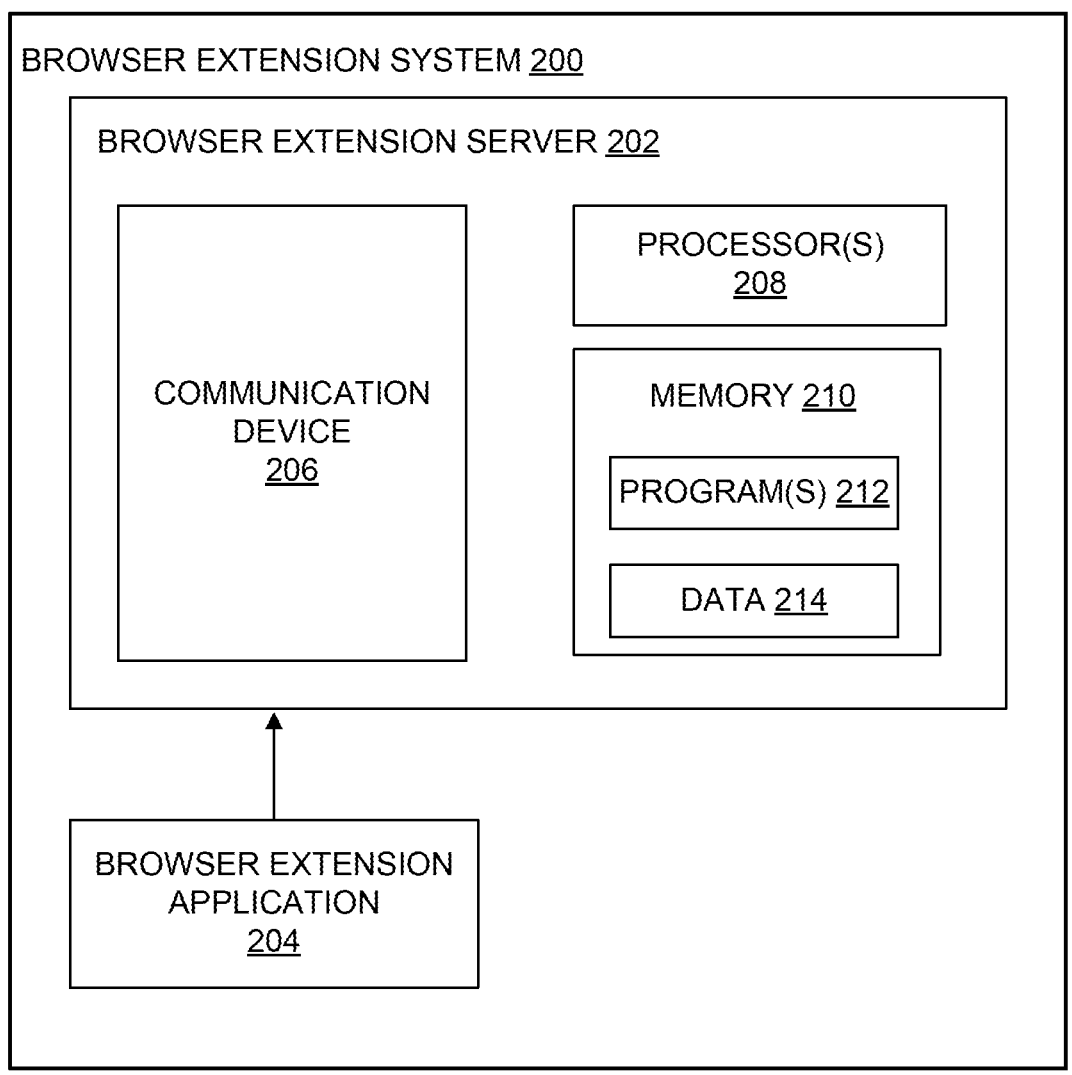
FIG. 2 is a block diagram of an exemplary browser extension system, consistent with disclosed embodiments.

FIG. 2 is a block diagram of an exemplary browser extension system 200, consistent with disclosed embodiments. As shown, browser extension system 200 may include browser extension server 202 and browser extension application 204. Browser extension server 202 may include a communication device 206, one or more processor(s) 208, and memory 210 including one or more programs 212 and data 214. Browser extension server 202 may be configured to perform operations consistent with providing browser extension application 204.

Browser extension server 202 may take the form of a server, general purpose computer, mainframe computer, or any combination of these components. Other implementations consistent with disclosed embodiments are possible as well. Browser extension application 204 may take the form of one or more software applications stored on a computing device, such as browser extension application 106 stored on computing device 102 described above.

Communication device 206 may be configured to communicate with one or more computing devices, such as computing device 102 described above. In some embodiments, communication device 206 may be configured to communicate with the computing device(s) through browser extension application 204. In particular, in some embodiments, browser extension server 202 may be configured to detect, through browser extension application 204 and communication device 206, a field in a web page provided by the computing device through a web browser application. The web page may be, for example, associated with a merchant system, such as merchant system 114 described above. Further, in some embodiments, browser extension server 202 may be configured to populate, through the browser extension application 204, the field with data associated with the computing device and/or with a user associated with the computing device. The data may include, for example, an indication of a financial service account associated with a computing device. In some embodiments, browser extension server 202 may be configured to generate a secure token, and the field may be populated with the secure token. Communication device 206 may be configured to communicate with the computing device(s) in other manners as well.

Communication device 206 may be further configured to communicate with one or more merchant systems, such as merchant system 114 described above. In some embodiments, browser extension server 202 may be configured to submit, through the browser extension application 204, the data associated with the computing device and/or with a user associated with the computing device to the merchant system(s). Communication device 206 may be configured to communicate with the merchant system(s) in other manners as well.

Communication device 206 may be still further configured to communicate with one or more FSP systems, such as FSP system 112 described above. In some embodiments, the FSP system may provide a financial service account associated with a computing device, and communication device 206 may be configured to communicate with one or more other entities, such as the FSP system(s), to generate a secure token. For example, communication device 206 may be configured to communicate with the FSP system(s) to generate a secure token mapped to the financial service account associated with the computing device. Communication device 206 may be configured to communicate with the other entities in other manners.

Communication device 206 may be configured to communicate with other components as well. In general, communication device 206 may be configured to provide communication over a network, such as network 116 described above. To this end, communication device 206 may include, for example, one or more digital and/or analog devices that allow browser extension system 200 to communicate with and/or detect other components, such as a network controller and/or wireless adaptor for communicating over the Internet. Other implementations consistent with disclosed embodiments are possible as well.

Processor(s) 208 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of browser extension system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. The disclosed embodiments are not limited to separate programs or computers configured to perform dedicated tasks. For example, memory 210 may include a single program 212 that performs the functions of browser extension system 200, or program(s) 212 may comprise multiple programs. Memory 210 may also store data 214 that is used by program(s) 212. Data 214 may include, for example, data associated with the computing device(s) and/or user(s) associated with the computing device(s).

In certain embodiments, memory 210 may store sets of instructions for carrying out the processes described below in connection with FIG. 4. Other instructions are possible as well. In general, instructions may be executed by processor(s) 208 to perform one or more processes consistent with disclosed embodiments.

The components of browser extension system 200 may be implemented in hardware, software, or a combination of both hardware and software, as will be apparent to those skilled in the art. For example, although one or more components of browser extension system 200 may be implemented as computer processing instructions, all or a portion of the functionality of browser extension system 200 may be implemented instead in dedicated electronics hardware.

In some embodiments, browser extension system 200 may also be communicatively connected to one or more database(s) (not shown). Alternatively, such database(s) may be located remotely from browser extension system 200. Browser extension system 200 may be communicatively connected to such database(s) through a network, such as network 116 described above. Such database(s) may include one or more memory devices that store information and are accessed and/or managed through browser extension system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s).

Figure 3:
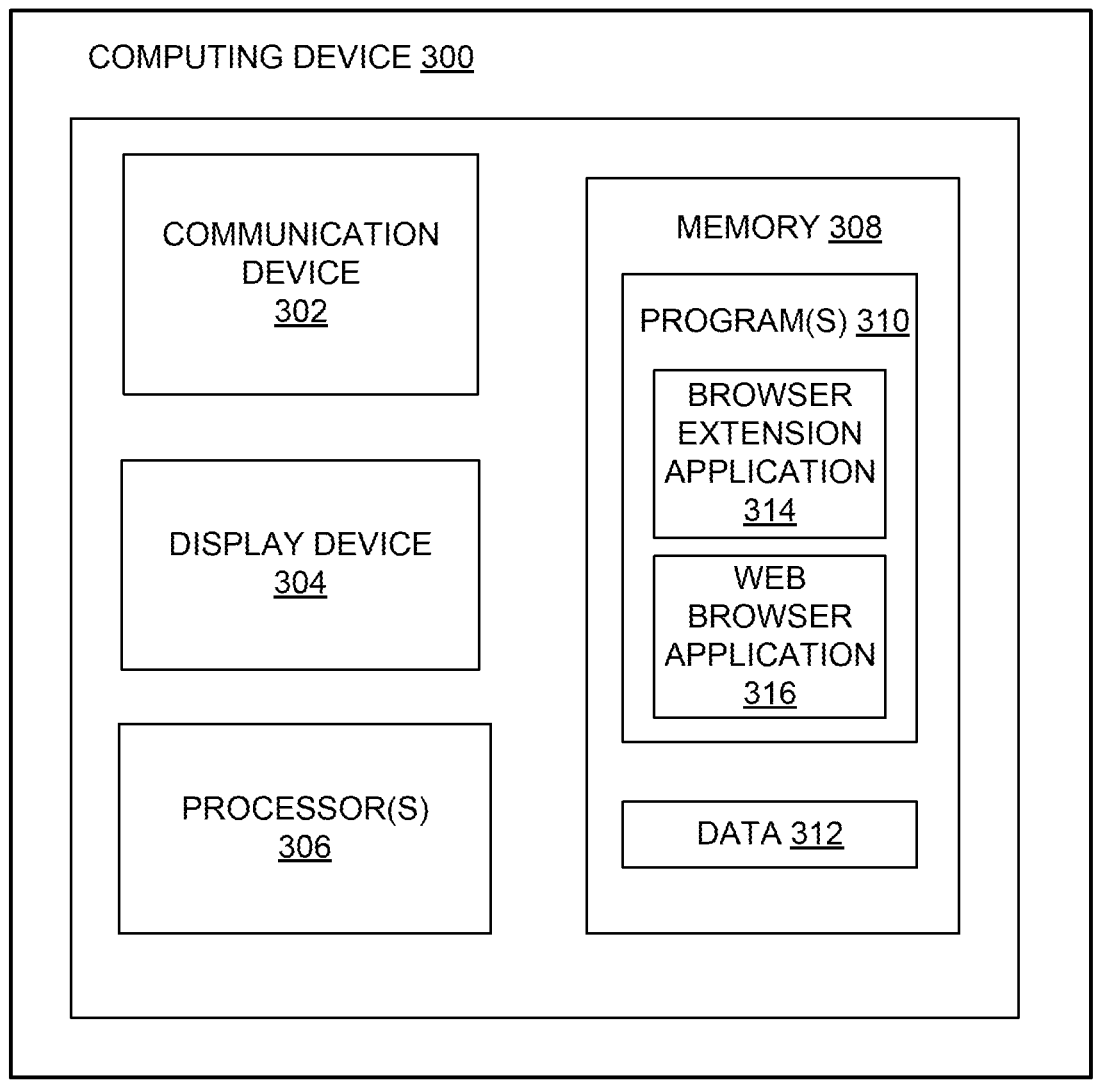
FIG. 3 is a block diagram of an exemplary computing device, consistent with disclosed embodiments.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, browser extension application 314 and web browser application 316.

In some embodiments, computing device 300 may take the form of a desktop or mobile computing device, such as a desktop computer, laptop computer, smartphone, tablet, or any combination of these components. Alternatively, computing device 300 may be configured as any wearable item, including jewelry, smart glasses, or any other device suitable for carrying or wearing on a customer's person. Other implementations consistent with disclosed embodiments are possible as well. Computing device 300 may, for example, be similar to computing device 102 described above.

Communication device 302 may be configured to communicate with a browser extension server, such as browser extension servers 110 and 202 described above. For example, communication device 302 may be configured to receive from the browser extension server data associated with computing device 300 and/or with a user maintained at the browser extension server. Communication device 302 may receive such data through, for example, the browser extension application 314. As still another example, communication device 302 may be configured to receive from the browser extension server a secure token mapped to the financial service account. Communication device 302 may receive the secure token through, for example, the browser extension application 314. Other examples are possible as well.

In some embodiments, communication device 302 may be further configured to communicate with one or more merchant systems, such as merchant system 114 described above. For example, communication device 302 may be configured receive from a merchant system data describing a web page associated with the merchant system. Communication device 302 may receive the data describing the web page through, for example, the web browser application 316. As another example, communication device 302 may be configured to submit to the merchant system data populated in fields in the web page. Communication device 302 may submit the data populated in the fields in the web page through, for example, the browser extension application 314.

In some embodiments, communication device 302 may be further configured to communicate with one or more FSP systems, such as FSP system 112 described above. For example, communication device 302 may be configured to interact with an FSP system to generate a secure token. Other examples are possible as well. Communication device 302 may be configured to communicate with other components as well.

Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, web pages provided by computing device 300 through web browser application 116. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. Data 312 may include, for example, data associated with computing device(s) and/or with user(s) associated with computing device(s).

In some embodiments, program(s) 310 may include a browser extension application 314. The browser extension application 314 may be executable by processor(s) 306 to perform operations including, for example, detecting field(s) in a web page associated with a merchant system and provided by through web browser application 316. The operations may still further include, for example, in response to detecting the field(s), automatically populating the field(s) with data associated with the computing device and automatically submitting the data to the merchant system. The browser extension application 314 may be executable by processor(s) 306 to perform other operations as well.

In some embodiments, program(s) 310 may further include web browser application 316. The web browser application may be executable by processor(s) 306 to perform operations including, for example, providing web pages for display. The web pages may be provided, for example, via display device 304. In some embodiments, the web pages may be associated with a merchant system, such as merchant system 114 described above. Web browser application 316 may be executable by processor(s) 306 to perform other operations as well.

In certain embodiments, memory 308 may store sets of instructions for carrying out the processes described below in connection with FIG. 5. Other instructions are possible as well. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as a computer processing instructions, all or a portion of the functionality of computing device 300 may be implemented instead in dedicated electronics hardware.

Figure 4:
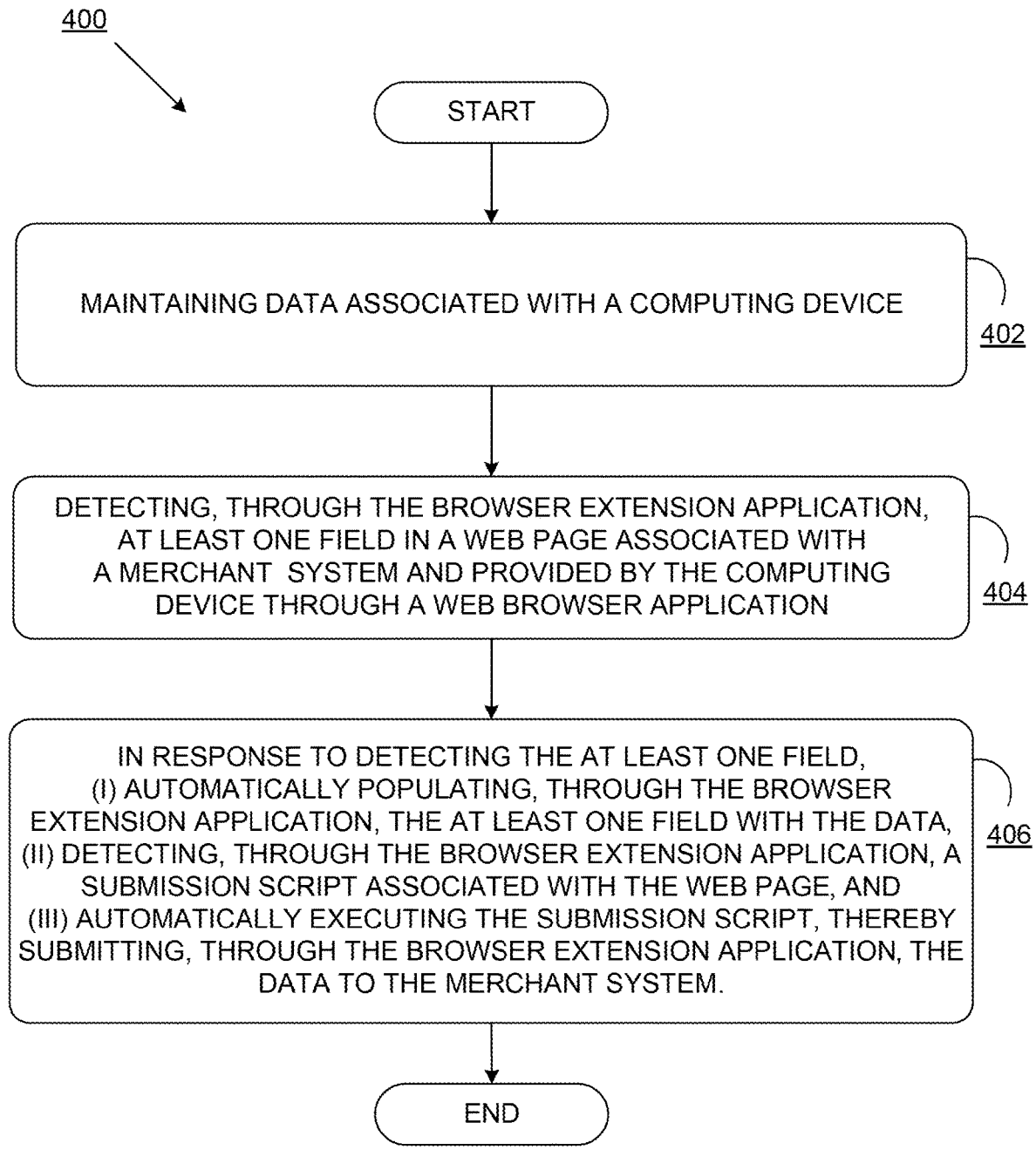
FIG. 4 is a flowchart of an exemplary browser extension process, consistent with disclosed embodiments.

FIG. 4 is a flowchart of an exemplary browser extension process 400, consistent with disclosed embodiments. Browser extension 400 may be carried out by a browser payment server, such as browser extension servers 110 and 200 described above, and/or a browser extension application, such as browser extension applications 106, 204, and 314 described above.

As shown in FIG. 4, the browser extension process begins at step 402 with maintaining data associated with the computing device. For example, the data may be maintained by the browser extension server and/or a database associated with the browser extension server. Alternatively or additionally, the data may be maintained at one or more other entities, such as at an FSP system.

The data may have been received from, for example, a user and/or a computing device. For example, the data may include an indication of a financial service account associated with the computing device. The financial service account may be, for example, an account provided by a financial service provider, such as FSP system 112 described above. The financial service account may be one of, for example, a credit card account, a loan accounts, a checking account, a savings account, and a reward or loyalty program account. The financial service account may take other forms as well. The indication of the financial service account may be, for example, a PAN (e.g., a 16-digit PAN often printed on a financial service product), routing information, or other identifier of a financial service account. The indication of the financial service account may take other forms as well. As another example, the data may include data for use in a purchase transaction, such as an indication of a billing address, shipping recipient, a shipping address, shipping preferences, and/or gift preferences. Other data is possible as well.

The browser extension process 400 continues at step 404 with detecting, through the browser extension application, at least one field in a web page associated with a merchant system (or other third-party system) and provided by the computing device through a web browser application. In some embodiments, the browser extension application may be configured to, for example, review the script (e.g., HTML, XML) of the web page for fields requiring population. The browser extension application may, in some embodiments, include one or more content scripts configured to review the script of the web page. For instance, the browser extension application and/or content script(s) may review input field identifiers for input fields in the web page script to search for identifiers pertaining to fields requiring population, such as payment fields, billing fields, and/or shipping fields. Upon detecting a field, the browser extension application may provide to the browser extension server an indication of the field. The browser extension application and/or browser extension server may detect the field(s) in other manners as well.

The browser extension process 400 continues at step 406 where, in response to detecting the at least one field, the browser extension server automatically populates, through the browser extension application, the at least one field with a secure token mapped to the data. The browser extension application may, in some embodiments, include one or more content scripts configured to review the script of the web page and populate the detected field(s). For instance, the browser extension application and/or content script(s), having reviewed input field identifiers for input fields in the web page script to search for identifiers pertaining to fields requiring population, the browser extension application and/or content script(s) may populate the detected field(s).

The secure token may be generated by the browser extension application and/or browser extension server. In some embodiments, the browser extension application and/or browser extension server may interact with one or more other entities in generating the secure token.

In some embodiments, the browser extension server may populate the at least one field by providing to the browser extension application data maintained at the browser extension server and corresponding to a detected field. For example, if at step 404 a shipping address field is detected, the browser extension server may provide to the browser extension application data indicating a shipping address associated with the computing device, and the browser extension application may populate the shipping address field with the data indicating the shipping address. As another example, if at step 404 a payment field is detected, the browser extension server may provide to the browser extension application data indicating a financial service account associated with the computing device, and the browser extension application may populate the payment field with the indication of the financial service account. The browser extension application may store the provided data and generate the secure token, which may be mapped to the provided data stored at the browser extension application.

Alternatively, in some embodiments, the browser extension server may populate the at least one field by identifying data maintained at the browser extension server and corresponding to a detected field, as in any of the examples above, and generating the secure token, which may be mapped to the indicated data stored at the browser extension server.

In some embodiments, if at step 404 a payment field is detected, the browser extension server may interact with an FSP system, such as FSP system 112, associated with the financial service account to generate a secure token mapped to the financial service account and provide the secure token to the browser extension application. The browser extension application may populate the payment field with the secure token.

In some embodiments, the browser extension server may generate the secure token in connection with one or more other entities. For example, in the case of a secure token mapped to a financial service account, the browser extension server may generate the secure token in connection with a financial service provider providing the financial service account. For example, the browser extension server may provide the secure token and/or information associated with the secure token (e.g., a decryption token) to one or more other entities, such as FSP system 112, merchant system 114, etc. The browser extension server may generate the secure token in other manners as well.

In some embodiments, a secure token identifying a financial service account may map directly (that is, without any intermediary) to the financial service account. In these embodiments, when a secure token is provided to a merchant, the merchant may receive payment directly from the financial service account, rather than from any intermediary. Such direct mapping may enable return processing. For example, where a good or service was purchased from a merchant during a purchase transaction involving a secure token, when the good is returned or the service is cancelled, the payment made for the good or service may be returned directly to the financial service account by the merchant. Other examples are possible as well.

In some embodiments, the secure token may be a limited-use token. For example, the secure token may be a single-use token. The single-use token may be used for only a single purchase transaction with a merchant, such that subsequent purchase transactions require a new secure token. As another example, the secure token may be a time-limited token. The time-limited token may be used only within a specified period of time, such that purchase transactions occurring after the period of time has expired require a new secure token. As still another example, the secure token may be a merchant-specific token. The merchant-specific token may be used one or more times with a single merchant, but may not be used with other merchants, such that purchase transactions with another merchant require a new secure token.

As yet another example, the secure token may be a money-limited token. The money-limited token may only be used for payments up to a prescribed amount, either individually or collectively. The secure token may take other forms as well.

In some embodiments, before generating the secure token, the browser extension server may provide to the computing device an offer to generate the secure token. The browser extension server may provide the offer through, for example, the browser extension application. In some embodiments, the offer may include, for example, an opportunity for a user of the computing device to select a financial service product or financial service account for which to create a secure token. The browser extension server may receive from the computing device an acceptance of the offer and, in response to receiving the acceptance, may generate the secure token. The browser extension server may receive the acceptance through, for example, the browser extension application as well.

While the foregoing description focused on secure tokens, in some embodiments the browser extension server may be configured to, through the browser extension application, automatically populate one or more fields in the web page with unsecured data as well. For example, some fields may be populated with unsecured data, while other fields may be populated with secure tokens.

Also at step 406, and further in response to detecting the at least one field, the browser extension server may automatically submit, through the browser extension application, the secure token to the merchant. The browser extension application may, in some embodiments, include one or more content scripts configured to review the script of the web page. For example, the web page script may include a submission script through which data populated into field(s) in the web page may be submitted to the merchant system. In some embodiments, the browser extension application and/or content script(s) may be configured to detect a submission script associated with the web page, modify the submission script to include the secure token to be submitted, and automatically execute the submission script, thereby causing the secure token to be submitted to the merchant system.

Figure 5:
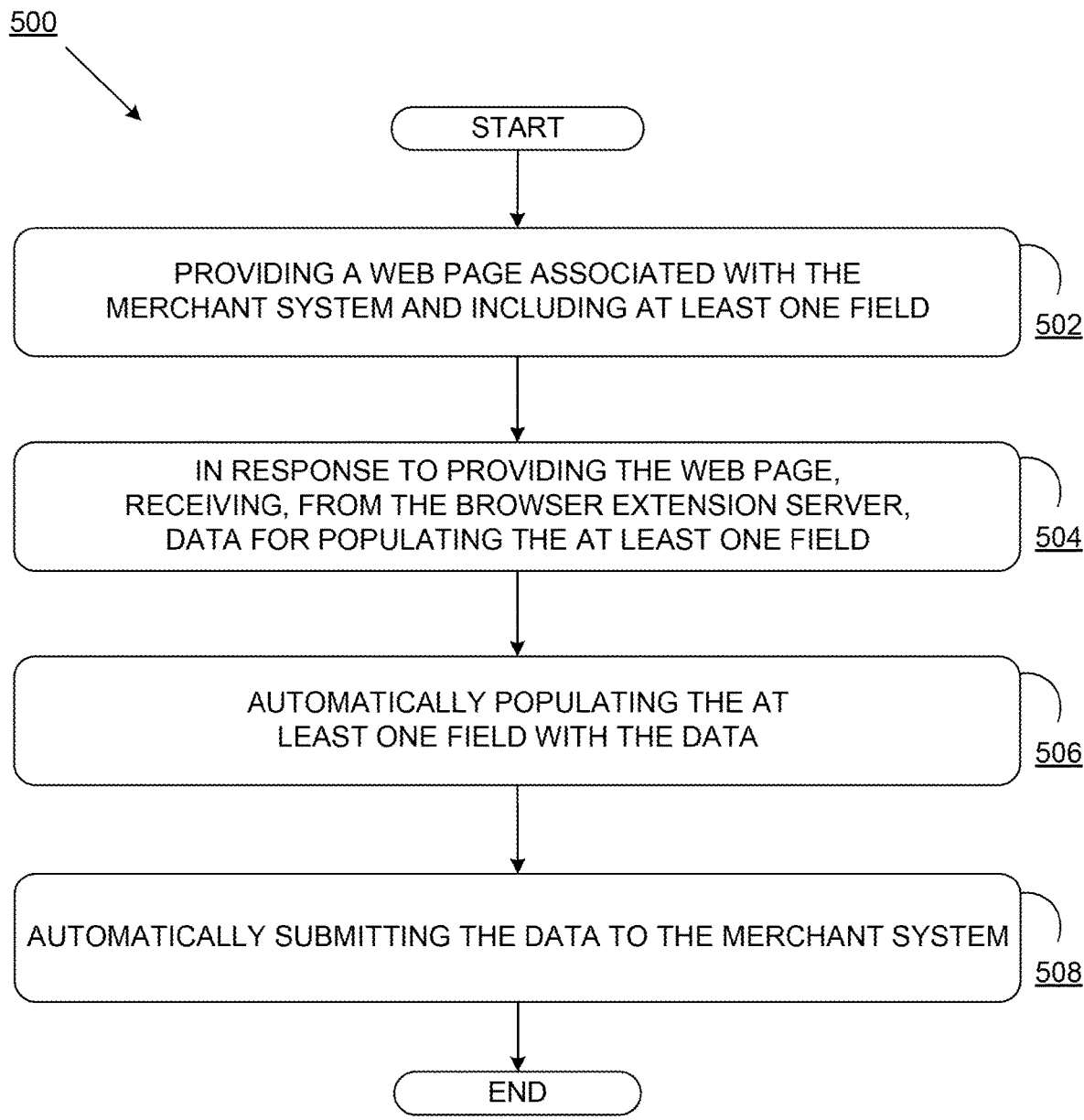
FIG. 5 is a flowchart of another exemplary browser extension process, consistent with disclosed embodiments.

FIG. 5 is a flowchart of another exemplary browser extension process 500, consistent with disclosed embodiments. Browser extension process 500 may be carried out at a computing device, such as computing devices 102 and 300 described above. For example, browser extension process 500 may be carried out by a browser extension application executed by the computing device.

As shown in FIG. 5, the process 500 begins at step 502 with the computing device providing a web page that is associated with a merchant system (or other third-party system) and includes at least one field. In some embodiments, the computing device may provide the web page through, for example, a web browser application executed at the computing device, such as web browser applications 108 and 316 described above. Alternatively or additionally, the computing device may provide the web page through, for example, a display device, such as display device 304 described above.

In some embodiments, the merchant system may be similar to merchant system 114 described above. In some embodiments, the merchant system may be associated with a merchant that provides goods or services. Further, in some embodiments, the web page may be online retail web page through which a user of the computing device may engage in purchase transactions to purchase the merchant's goods or services. Other web pages are possible as well.

In some embodiments, the field(s) may include a payment field in which information associated with a financial service product may be entered by a user of the computing device. For example, the field may be a field in which a PAN or other identifier may be entered. Other examples are possible as well. The field may be, for example, an input field in the script (e.g., HTML, XML) of the web page. In some embodiments, an input field identifier for the field may pertain to payment. Alternatively or additionally, in some embodiments the field(s) may include billing and/or shipping fields in which information associated with billing and/or shipping may be entered by a user of the computing device. The fields may be, for example, input field in the script (e.g., HTML, XML) of the web page. In some embodiments, input field identifiers for the field may pertain to billing and/or shipping. The fields may take other forms as well.

The browser extension process 500 continues at step 504 where, in response to providing the webpage, the computing device receives, from the browser extension server, data for populating the at least one field. In some embodiments, the browser extension server may provide a secure token for populating a field, where the secure token is mapped to data corresponding to the field. For example, the browser extension server may provide a secure token mapped to a financial service account for populating a payment field and/or a secure token mapped to data indicating a shipping address for populating a shipping address field(s). In some embodiments, the computing device may receive the secure token(s) through the browser extension application. The computing device may receive the secure token(s) in other manners as well.

In embodiments where the data includes a secure token, the secure token may be a generated identifier that maps back to an identifier of the underlying data. The secure token identifier may be, for example, a randomly generated identifier. Other secure tokens are possible as well.

In some embodiments, the secure token may be a limited-use token. For example, the secure token may be a single-use token. The single-use token may be used for only a single purchase transaction with a merchant, such that subsequent purchase transactions require a new secure token. As another example, the secure token may be a time-limited token. The time-limited token may be used only within a specified period of time, such purchase transactions occurring after the period of time has expired require a new secure token. As still another example, the secure token may be a merchant-specific token. The merchant-specific token may be used one or more times with a single merchant, but may not be used with other merchants, such that purchase transactions with another merchant require a new secure token. As yet another example, the secure token may be a money-limited token. The money-limited token may only be used for payments up to a prescribed amount, either individually or collectively. The secure token may take other forms as well.

While the foregoing description focused on secure tokens, in some embodiments the browser extension server may be configured to, through the browser extension application, automatically populate one or more fields in the web page with unsecured data as well. For example, some fields may be populated with unsecured data, while other fields may be populated with secure tokens.

At step 506, the computing device automatically populates the at least one field with the secure token. In some embodiments, the computing device may automatically populate the field(s) through the browser extension application. The browser extension application may, in some embodiments, include one or more content scripts configured to review the script of the web page and populate the detected field(s). For instance, the browser extension application and/or content script(s), having reviewed input field identifiers for input fields in the web page script to search for identifiers pertaining to fields requiring population, the browser extension application and/or content script(s) may populate the detected field(s).

The browser extension process 500 continues at step 508 where the computing device automatically submits the secure token to the merchant system. In some embodiments, by submitting the secure token to the merchant system the computing device may effectuate a purchase transaction in which a user of the computing device purchases a good or service from a merchant associated with the merchant server. In some embodiments, upon receiving the secure token, the merchant may seek authorization of the purchase transaction from a financial service provider.

In some embodiments, the merchant may seek authorization of the purchase transaction from a financial service provider by providing any secure token(s) mapped to payment data included in the data to an FSP system, such as FSP system 112 described above, associated with the financial service provider. Alternatively or additionally, the merchant may seek authorization of the purchase transaction from a financial service provider by providing a generated secure token to the FSP system. The financial service provider may use the payment data and/or secure token to authenticate the computing device and authorize the purchase transaction.

In some embodiments, a secure token may map directly (that is, without any intermediary) to the financial service account. In these embodiments, when the secure token is provided to the merchant system, the merchant system may receive payment directly from the financial service account, rather than from any intermediary. Such direct mapping may enable return processing. For example, where a good or service was purchased from the merchant during a purchase transaction involving a secure token, when the good is returned or the service is cancelled, the payment made for the good or service may be returned directly to the financial service account by the merchant. Other examples are possible as well.

In some embodiments, in response to submitting the secure token to the merchant system, the computing device may receive, from the merchant system, script describing an additional web page associated with the merchant, such as a page confirming the purchase transaction or a page containing additional fields requiring population. The computing device may provide the additional web page through, for example, a web browser application executed at the computing device, such as web browser applications 108 and 316 described above. Alternatively or additionally, the computing device may provide the additional web page through, for example, a display device, such as display device 304 described above. In embodiments where the additional page contains additional fields requiring population, steps 508-512 may be repeated to detect and populate the field(s) with data and submit the data to the merchant system.

Figure 6A:
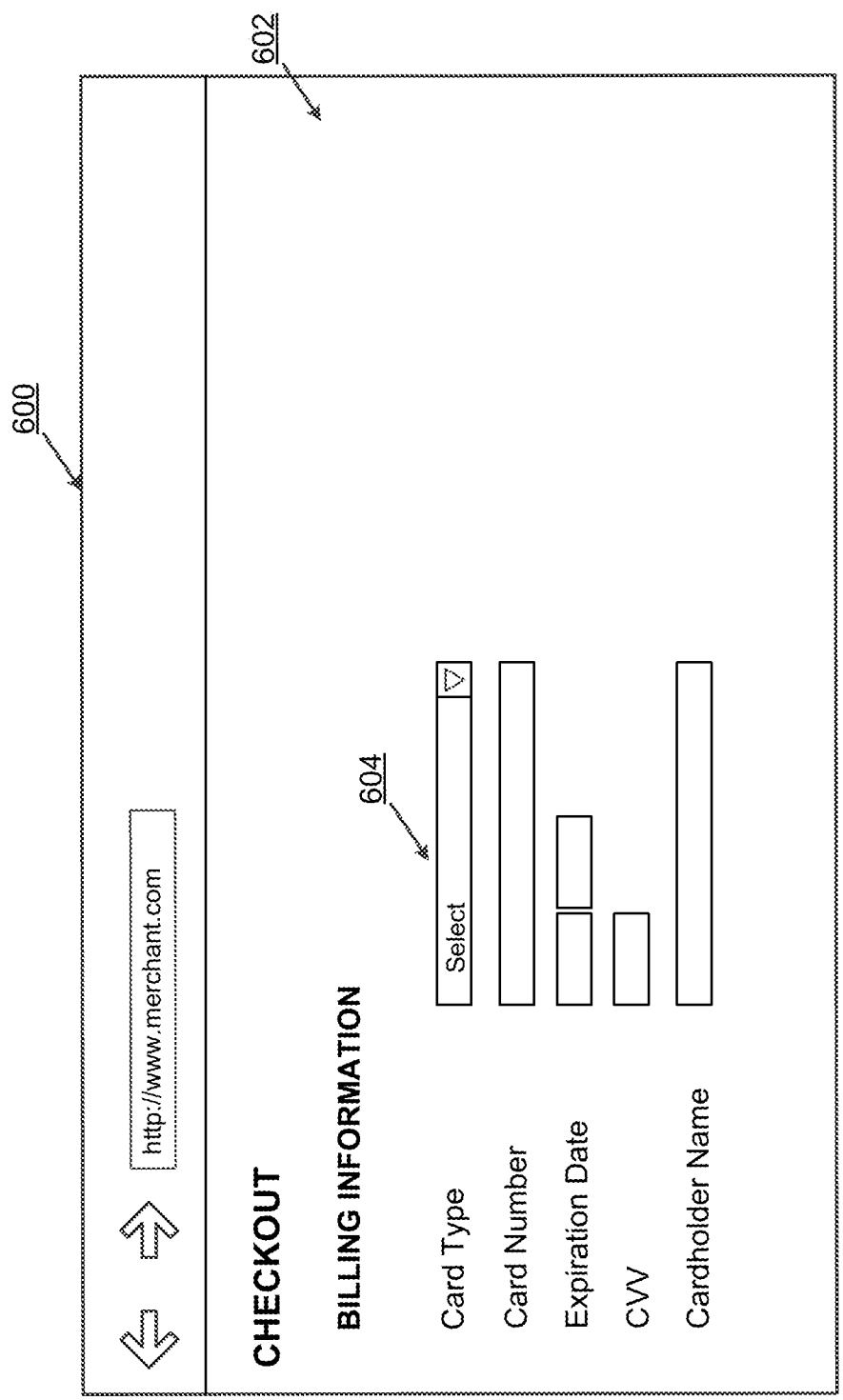
FIGS. 6A-E illustrate exemplary interfaces on computing devices, consistent with disclosed embodiments.
Figure 6B:
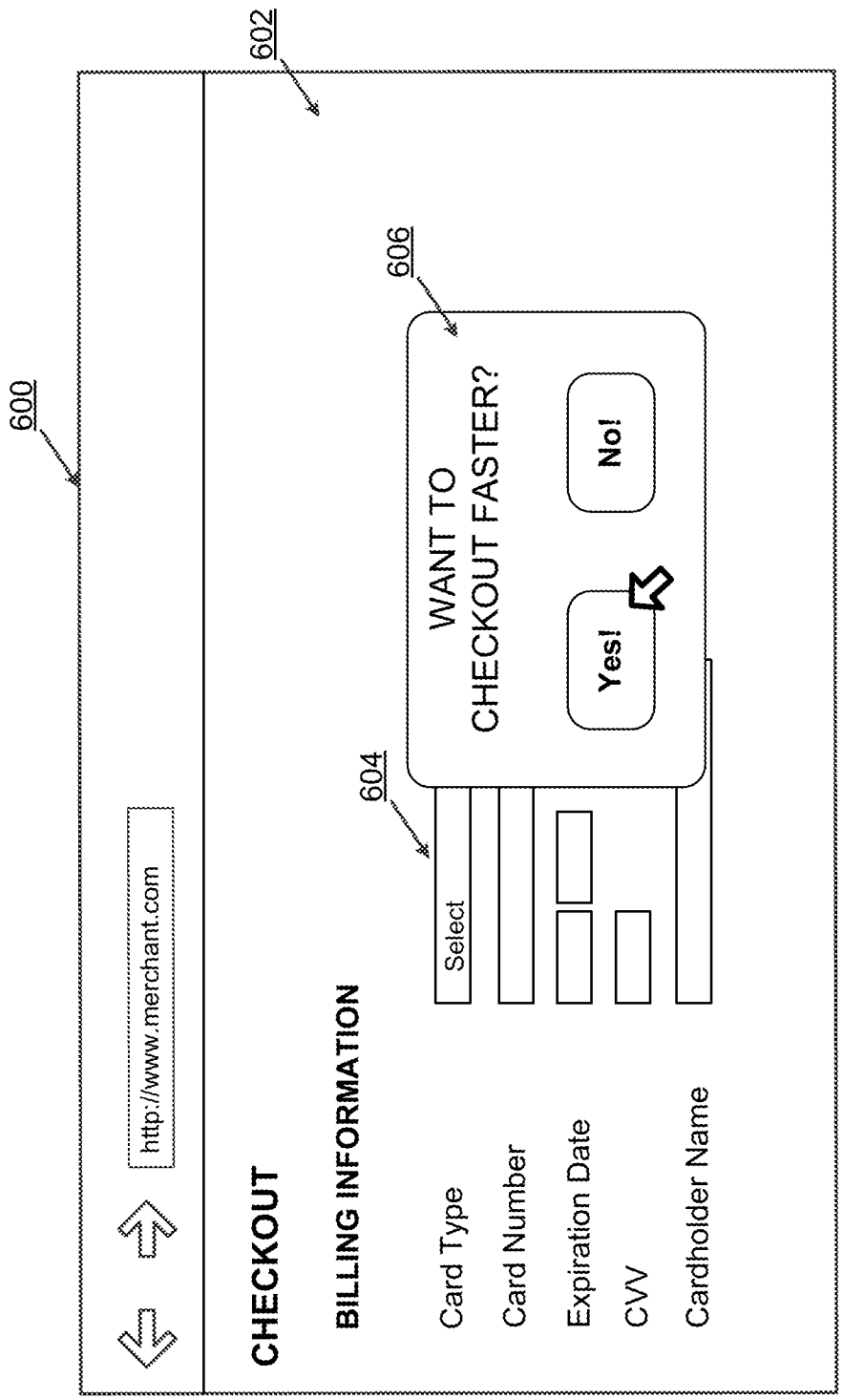

FIGS. 6A-E illustrate exemplary interfaces on computing devices, consistent with disclosed embodiments. As shown in FIG. 6A, a computing device may execute a web browser application 600. The computing device may be, for example, a laptop computer or a smartphone. Other computing devices are possible as well.

Through the web browser application 600, a web page 602 may be provided. In some embodiments, the web page 602 may be associated with a merchant or merchant system, such as merchant system 114 described above. For example, the web page 602 may be an online retail web page through which a user of the computing device may engage in a purchase transaction to purchase a good from the merchant.

In some embodiments, as shown in FIG. 6A, during a "Checkout" stage of the purchase transaction, a user of the computing device may be prompted to enter "Billing Information" into input fields on the web page 602. For example, the user may be prompted to enter payment data into fields 604, as shown. While certain fields are shown, other fields are possible as well.

In some embodiments, a browser extension server and/or a browser extension application executed at the computing device may detect the fields 604. For example, the browser extension application may include a content script configured to read a script describing the web page and detect the fields 604.

Figure 6C:
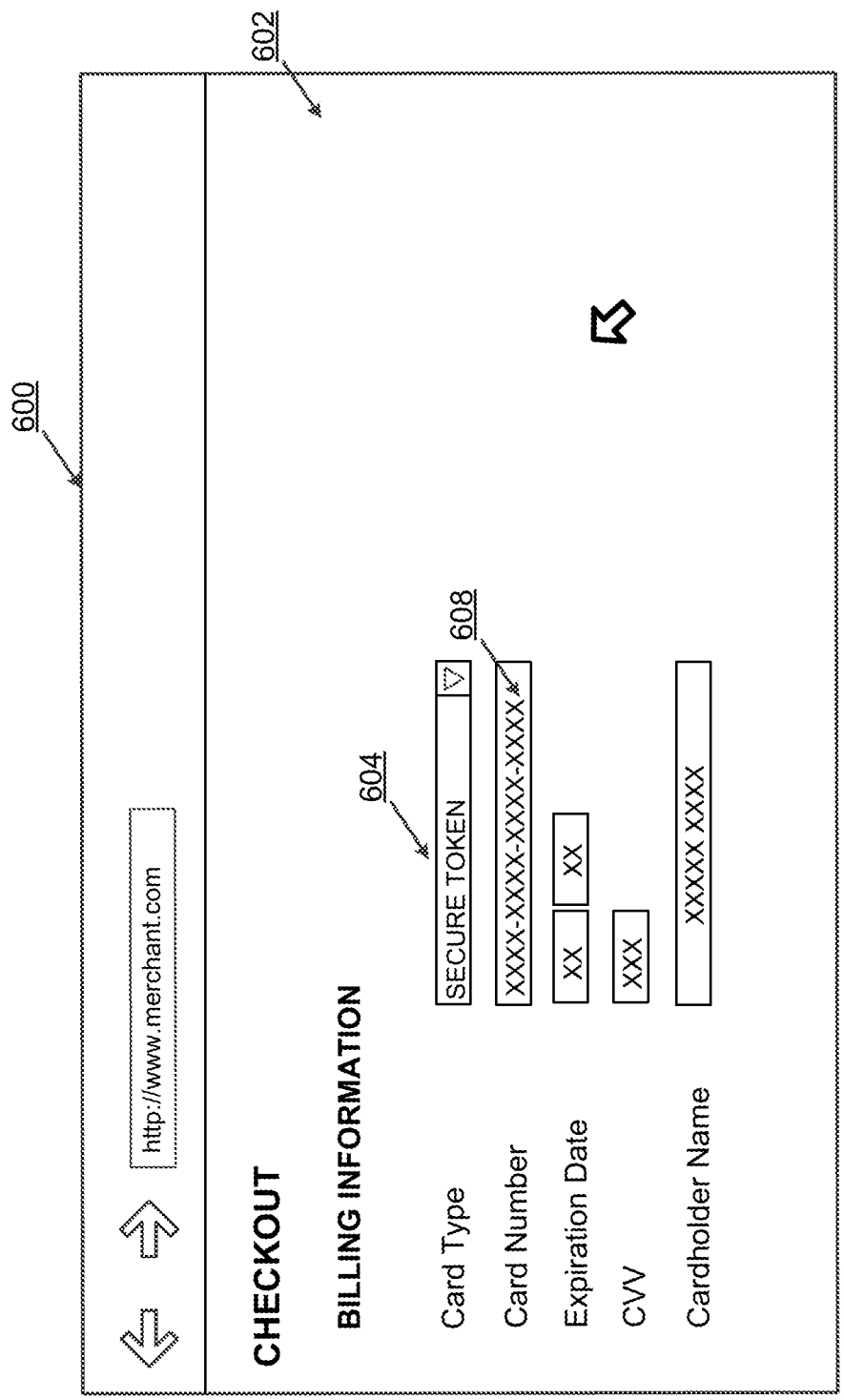

In response, the browser extension server and/or browser extension application executed at the computing device may, in some embodiments, provide a prompt 606 to a user of the computing device. In some embodiments, the prompt 606 may further permit a user to select and/or confirm data to be used in the purchase transaction, such as a financial service product and/or a shipping address to be used. In response to receiving a selection of the prompt 606, the browser extension server and/or browser extension application may automatically populate the detected fields 604, as shown in FIG. 6C. Alternatively, in some embodiments the browser extension server and/or browser extension application may automatically populate the detected fields 604 in response to detecting the fields 604, without providing the prompt 606 to the user.

As shown in FIG. 6C, the fields 604 may be automatically populated with one or more secure tokens 608. The secure token(s) may be, for example, mapped to data associated with the computing device and maintained at the browser extension server, browser extension application, and/or a database associated with the browser extension server. While FIG. 6C depicts the web page 602 with populated fields 604, in some embodiments, the computing device may not display the data populating the fields 604 before submitting the populated data to the merchant system. Further, while FIG. 6C depicts the populated fields 604 populated entirely by secure token(s), in some embodiments one or more of the populated fields 604 may be populated with unsecured data as well. For example, some of the populated fields 604 may be populated with unsecured data, while other of the populated fields 604 may be populated with the secure token(s).

Figure 6D:
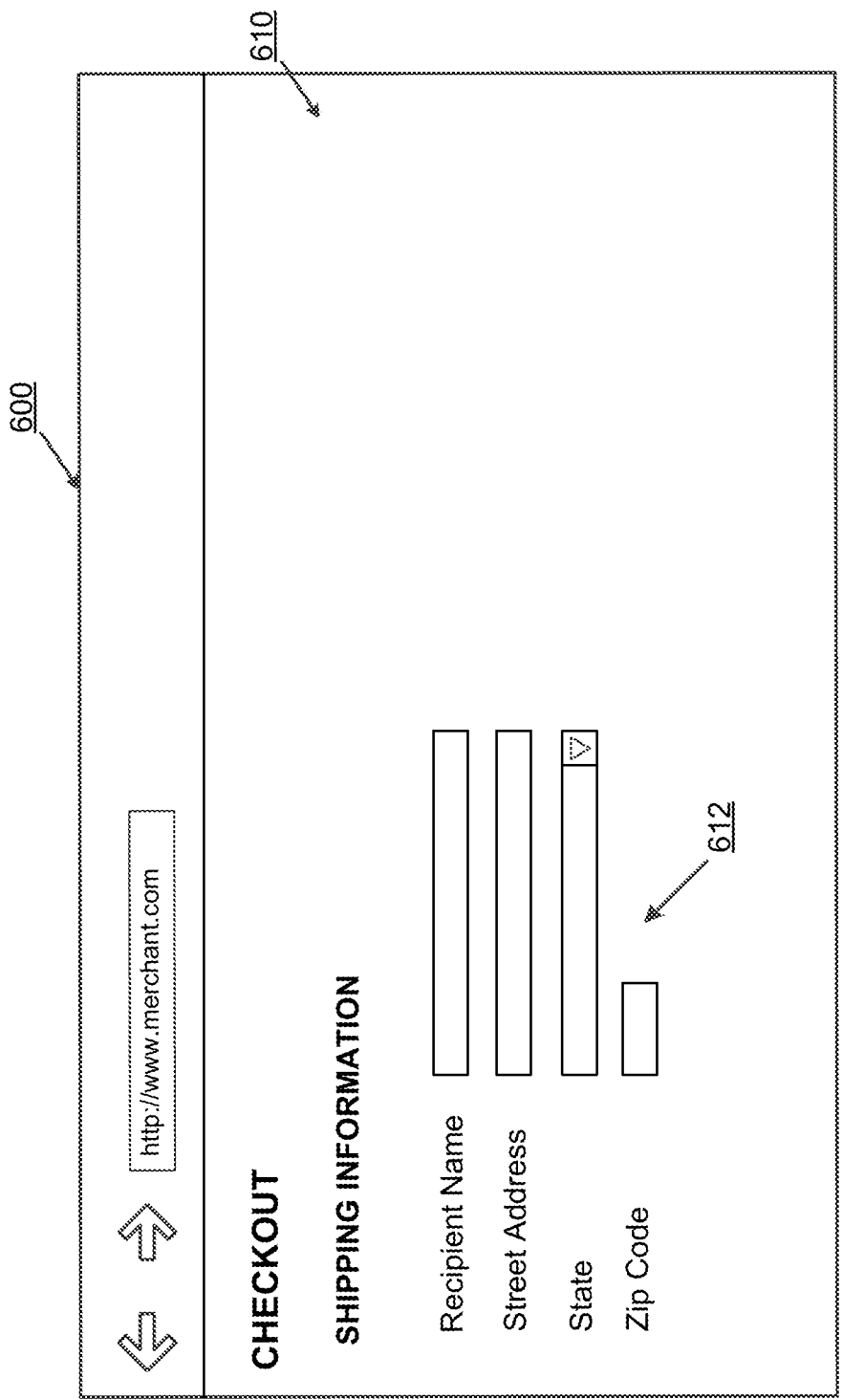
Figure 6E:
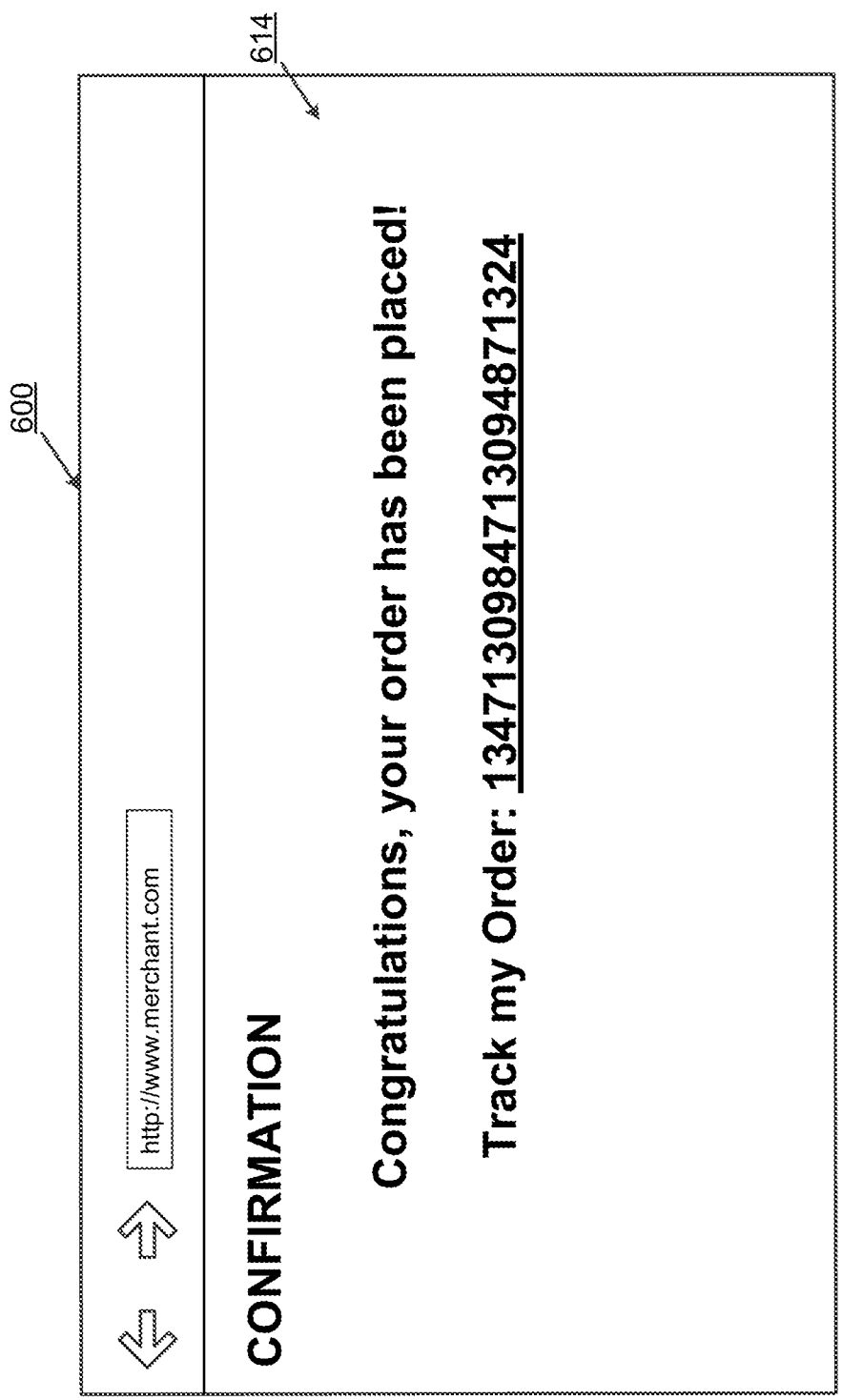

Once the populated secure token(s) is submitted to the merchant system, an additional web page 610 associated with the merchant system may be provided by through the web browser application 600. In some embodiments, the additional web page 610 may include fields 612 requiring population, as shown in FIG. 6D. The browser extension server and/or browser extension application may detect the fields 612 and, in response to detecting the fields 612, may automatically populate the fields with secure token(s) associated with the computing device and automatically submit the secure token(s) to the merchant system. Alternatively or additionally, the additional web page 614 may not include any fields requiring population, as shown in FIG. 6E.

While several example interfaces are shown in FIGS. 6A-E, it will be understood that the interfaces shown are merely examples and that other interfaces are possible as well.

FIG. 7 is a flowchart of a browser extension message stream 700, consistent with disclosed embodiments. It will be understood that messages in the browser extension message stream 700 are merely illustrative. Messages may be transmitted among the components and/or other components in other manners as well, and where a single message is shown, more messages are possible. The computing device, browser extension server, FSP system, and merchant system shown in FIG. 7 may be similar to, for example, computing devices 102 and 300, browser extension servers 110 and 202, FSP system 112, and merchant system 114, respectively.

As shown, the computing device may send a message 702 to the browser extension server. The message 702 may indicate, for example, at least one field detected in a web page, such as an online retail web page through which a user of the computing device may engage in a purchase transaction to purchase goods or services from a merchant associated with the merchant system.

Through message 706, the browser extension server may provide to the computing device data associated with the computing device and/or a secure token mapped to the data associated with the computing device for populating the at least one field detected in the web page. In some embodiments, prior to providing the data with message 706, the browser extension server may generate the secure token through messages 704a and 704b exchanged with one or more other entities. For example, for a secure token mapped to a financial service account for the computing device, the other entity may be an FSP system. Specifically, message 704a may be a request for generating a secure token. In response to receiving the request, the FSP system transmits information about the financial service account to the browser extension server in message 704b. The browser extension server then generates the secure token based on the information about the financial service account. The secure token may be provided as part or all of the data with message 706. The computing device may automatically populate the at least one field with the secure token and, with message 708, may automatically submit the secure token to the merchant system.

To complete the purchase transaction, the merchant system and the FSP system may authorize the purchase transaction through messages 710 and 712. For example, the merchant system may provide some or all of the secure token(s) (e.g., a secure token mapped to a financial service account) submitted by the computing device to the FSP system with message 710, and the FSP system may provide an authorization and/or payment to the merchant system through message 712.

In some embodiments, various features of the browser extension system may be activated, deactivated, and/or customized through a browser extension application control panel. For example, such a control panel may enable a user to provide indications of financial service accounts associated with the user and manage existing secure tokens. For instance, a user may use the control panel to deactivate an existing merchant-specific token. As another example, a user may raise or lower a prescribed limit on a money-limited token. Other examples are possible as well.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A system, comprising:
a memory storing instructions; and
a processor configured to execute the instructions to perform operations comprising:
displaying, through a web browser application, a web page, the web page being associated with a merchant system and including a field requiring population;
detecting the field requiring population via a browser extension application;
providing to a browser extension server an indication of the field requiring population;
receiving, through the browser extension application from the browser extension server, a secure token generated by the browser extension server mapped to data of a financial service account associated with a financial service provider, the token related to the field requiring population;
automatically, by the browser extension application, in response to receiving the secure token:
detecting a submission script associated with the web page;
modifying the submission script to include the secure token to be submitted; and executing the submission script to submit the secure token without displaying the secure token.

2. The system of claim 1, wherein the operations further comprise:
during a return processing associated with the purchase transaction, returning the payment directly to the financial service provider.

3. The system of claim 1, wherein the operations further comprise:
after receiving the secure token, receiving by the processor a script describing an additional web page confirming a purchase transaction.

4. The system of claim 1, wherein the secure token comprises a single-use token.

5. The system of claim 1, wherein the secure token comprises a time-limited token.

6. The system of claim 1, wherein the secure token comprises a merchant-specific token.

7. The system of claim 1, wherein:
the web page relates to a payment to the merchant; and the secure token comprises a money-limited token.

8. The system of claim 1, wherein the secure token is nonreversible.

9. A system, comprising:
a computing device configured to:
communicate with a browser extension server, the browser extension server configured to generate a secure token mapped to data of a financial service account associated with a financial service provider;
communicate with a merchant system;
display, through a web browser application, a web page on the computing device, the web page being associated with the merchant system and including a field requiring population;
detect the field requiring population via a browser extension application;
provide to the browser extension server an indication of the field requiring population;
receive, through the browser extension application from the browser extension server, a secure token;
automatically, by the browser extension application, in response to receiving the secure token:
detecting a submission script associated with the web page;
modifying the submission script to include the secure token to be submitted; and
executing the submission script, thereby causing the secure token to be submitted to the merchant system without displaying the secure token.

10. The system of claim 9, wherein the computing device is further configured to:
upon authorizing a purchase transaction, transmit a payment directly to the merchant system.

11. The system of claim 10, wherein the computing device is further configured to:
during a return processing associated with the purchase transaction, receive the payment directly from the merchant system.

12. The system of claim 9, wherein the secure token comprises a single-use token.

13. The system of claim 9, wherein the secure token comprises a time-limited token.

14. The system of claim 9, wherein the secure token comprises a merchant-specific token.

15. The system of claim 9, wherein the secure token comprises a money-limited token.

16. The system of claim 9, wherein the secure token is nonreversible.

17. The system of claim 9, wherein the computing device is further configured to:
receive, from the browser extension server, a decryption token associated with the secure token.

18. The system of claim 9, wherein the data corresponding to the secure token generated by the browser extension server comprises information for effectuating a purchase transaction.

* * * * *